Figure 1:
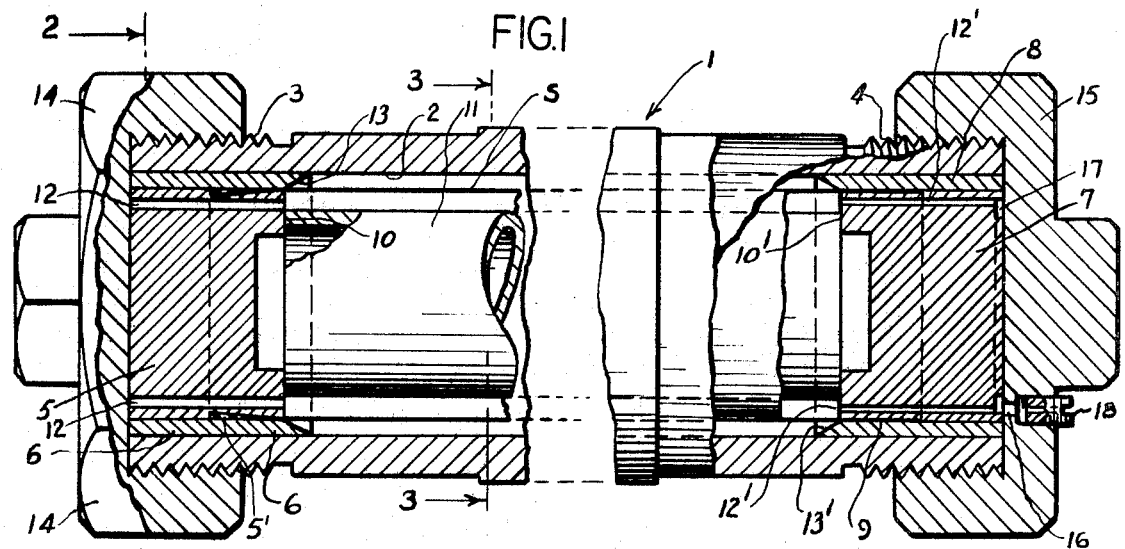

United States Patent [19]
Nelson

[11] 3,724,983
[45] Apr. 3, 1973

[54] APPARATUS FOR MAKING ROLLS

[75] Inventor: William B. Nelson, Sparta, N.J.

[73] Assignee: Ames Rubber Corporation, Hamburg, N.J.

[22] Filed: Feb. 19, 1971

[21] Appl. No.: 116,883

[52] U.S. Cl. .................. 425/129, 425/128, 425/468, 425/403, 425/242
[51] Int. Cl. ................................................. B29f 1/00
[58] Field of Search ........... 18/29, 36, 19 TM, 19 TC; 249/83, 87, 97

[56] References Cited

UNITED STATES PATENTS

| | | |
|---|---|---|
| 3,380,120 | 4/1968 | Rowland et al. ..................... 18/29 X |
| 2,684,502 | 7/1954 | Paulve ................................. 18/36 X |
| 3,402,758 | 9/1968 | Cushman ............................ 18/36 X |
| 2,845,657 | 8/1958 | Beare ................................. 249/83 X |
| 2,864,130 | 12/1958 | Beare ................................. 249/83 X |
| 3,355,772 | 12/1967 | Kolberg .............................. 18/29 X |
| 3,613,168 | 10/1971 | Rowland et al. ................ 18/30 WC X |
| 3,015,855 | 1/1962 | Markel .............................. 264/127 |

*Primary Examiner*—J. Howard Flint, Jr.
*Attorney*—Sandoe, Hopgood & Calimafde

[57] ABSTRACT

In the manufacture of metal cored elastomeric rolls having an outside protection sleeve, an extruded tubular sleeve of suitable material is placed in a mold having a cylindrical cavity of an inside diameter considerably in excess of the outside diameter of the sleeve, one end of the sleeve being anchored and the other end being free to move longitudinally. A cylindrical metal core is placed inside the sleeve and elastomeric material is then injected under pressure into the space between the core and the sleeve. The pressure stretches and expands the sleeve, forcing it into contact with the mold wall. The mold is then capped and heated to cure the elastomeric material.

7 Claims, 4 Drawing Figures

PATENTED APR 3 1973  3,724,983

INVENTOR.
WILLIAM B. NELSON
BY

ATTORNEYS

APPARATUS FOR MAKING ROLLS

This invention relates to apparatus for making metal cored elastomeric rolls having an outside tubular protective sleeve.

Such rolls have a variety of uses in various types of apparatus. One important use is in electrostatic copying machines in which such rolls, sometimes referred to as "fuser rolls" are used to feed copy paper to and through the stage where the electrically charged particles are fused to the paper at relatively high temperatures and at relatively high pressures. For this particular use the performance requirements are very high. The rolls must conform to close tolerances dimensionally, they must be stable dimensionally, the elastomeric body must be heat resistant and of a predetermined hardness, and the protective sleeve must be not only heat and abrasion resistant, but also it must remain bonded securely to the elastomeric body during and after repeated flexings over prolonged periods of use.

Heretofore it has been known to use solid polymers of tetrafluoroethylene obtainable commercially under the trademark or trade name "TEFLON" as the material from which the tubular protective sleeves have been fabricated. Silicone rubber has commonly been used as the elastomeric material. According to a known method of making such rolls a cylindrical body of elastomeric material is molded onto the metal core and cured thereon. Thereafter a sleeve of heat shrinkable "TEFLON" of a diameter slightly larger than the prescribed final outside diameter of the elastomeric body is placed over the elastomeric body with adhesive and is then subjected to heat. The heat applied causes the sleeve material to shrink and thereby become securely bonded to the elastomeric material. One difficulty with this method is that it is difficult to maintain dimensional tolerances in the finished rolls. Moreover, the bond between the sleeve and the elastomeric material tends to become loosened or cracked by repeated flexing.

According to the present invention tubular sleeves of such material are extruded to an outside diameter which lies between the outside diameter of the core and the inside diameter of the mold cavity. Such a tubular sleeve is placed inside the mold cavity, concentric with the core and the mold cavity but spaced from both. One end of the sleeve is then anchored securely at the inlet end of the mold while the other end is guided to maintain concentricity, but is free to move longitudinally. The inlet end of the mold, which is provided with one or more inlet openings through which the elastomeric material may be injected into the mold, is then attached to a conventional extruder. The outlet end of the mold is capped, but the cap is provided with an orifice of restricted area adapted to restricted egress of air as the elastomeric material is injected.

Elastomeric material is then injected into the mold into the space between the core and the sleeve.

As the injection of elastomeric material continues, air is expelled through the orifice, and the elastomeric material eventually fills the space between the core and the sleeve. At this time due to the restricted egress of material from the mold, a back pressure is built up which causes the sleeve to stretch and expand outwardly against the wall of the shell. The free end of the sleeve is permitted to move longitudinally as the expansion takes place. As the sleeve expands, air from the space between the sleeve and the shell is expelled through the orifice, and when all of the air has been expelled, as indicated by the discharge of elastomeric material through the orifice, the mold is removed from the extruder.

The inlet end is then capped. The orifice in the cap at the outlet end of the mold is preferably left open or partially open as a vent to prevent build up of excessive pressures within the mold during curing. The mold is then placed in a curing chamber and heat cured in accordance with conventional practice.

Figure 2:
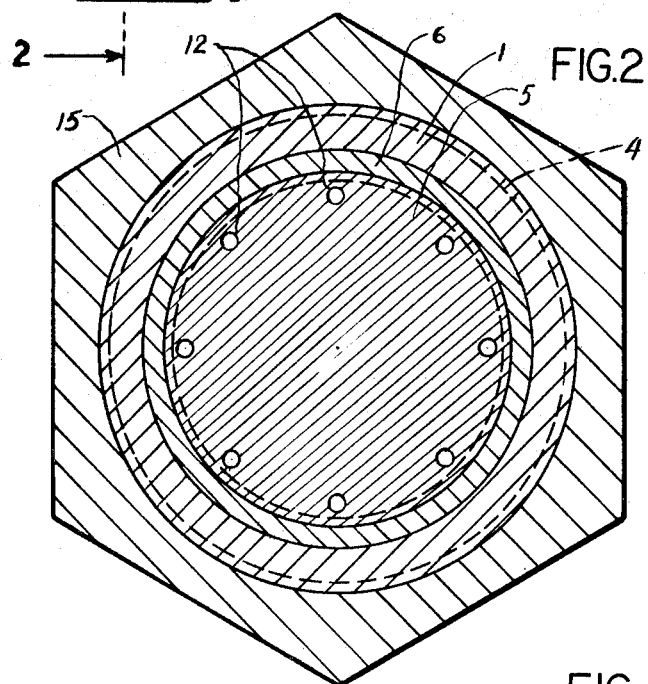
Figure 3:
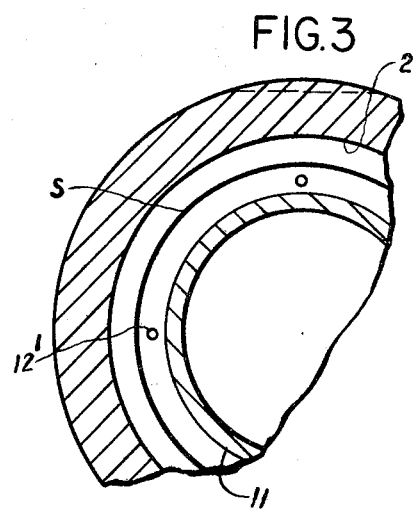
Figure 4:
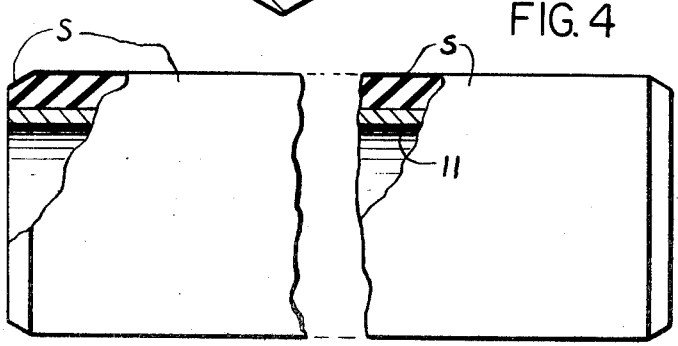

A preferred embodiment of apparatus for carrying out the above described method is shown in the accompanying drawings, in which:

FIG. 1 is a longitudinal section through the mold.
FIG. 2 is a section on the line 2—2 of FIG. 1.
FIG. 3 is a section on the line 3—3 of FIG. 1.
FIG. 4 is a side elevation of the finished roll, partly in section.

Referring to the drawings, the mold comprises a tubular outer shell 1 having a smooth cylindrical bore 2 which forms the wall of the mold cavity, and having externally threaded ends 3 and 4. The end 3 is the inlet end of the mold through which elastomeric material is injected into the mold. This end is provided with a support member which includes means to grip and hold the end of a tubular sleeve S. In the embodiment illustrated the support member includes a plug 5, the center surface of one end of which is tapered as shown at 5', and a collar 6, so that as the two parts of the support member are assembled with the end of the sleeve S located between the tapered surface of the plug and the inside surface of the collar, it is gripped and held tightly against endwise movement as elastomeric material is injected into the mold.

The end 4 is the discharge end. It is provided with a second support member comprising a plug 7 and collar 8. The exterior end of plug 7 fits snugly into the collar 8 in sliding relation therewith, which, in turn, fits snugly into the outer shell. However, the interior end of the plug is of slightly reduced diameter so that when the plug is assembled with the collar a cylindrical groove 9 is provided to receive and guide the end of the tubular sleeve S without restricting its endwise movement.

Each of the end plugs 5 and 7 is counterbored to provide shoulders 10, 10' to support and center the metal core 11. The said core may be either solid or tubular, as shown. Each of the end plugs is provided with a plurality of ports 12, 12' of small diameter opening into the space between the core and the sleeve. The ports 12 in the plug 5 serve as inlet ports through which elastomeric material may be injected into the mold in the space between the core 11 and the sleeve S. The ports 12' in the plug 7 are preferably of smaller diameter and less in number than those in the plug 5 and they serve as discharge ports through which air may be expelled as the mold is filled with elastomeric material. Each of the collars 6 and 8 is provided with a beveled surface 13, 13' which extends to and meets the cylindrical bore 2 of the shell in order to provide beveled surfaces at each end of the roll.

An internally threaded end cap 14 is provided for the inlet end of the mold and a similar internally threaded cap 15 is provided for the exit end of the mold. The cap 15 is provided with an orifice of restricted area 16 for the egress of air. The plug 7 is provided with an annular groove 17 formed in its outer surface which provides communication between each of the ports 12 and the orifice 16. The orifice may, if desired, be closed by a set screw 18 which may or may not be provided with a small bleed passage 19 for reasons hereinafter explained.

In the use of the mold in the practice of the process, one end of the tubular sleeve S is inserted into the space between the opposed tapered surfaces of the plug 5 and collar 6, and the two parts are pressed together until the end of the collar is flush with the end of the plug as shown in the drawing. This locks the end of the tubular sleeve firmly in position.

Next, the metal core is placed inside the sleeve S and is seated on the shoulder provided by the counterbore of the plug 5. Then with this assembly in upright position, the plug 7 is inserted in the sleeve and the shoulder provided by the counterbore of the plug is seated on the end of the core. The collar 8 is then slid over the plug 7 and the sleeve. The assembly is then inserted into the mold shell. The end cap 15 is now placed over the end of the shell and screwed down. Finally, the end 3 of the shell is screwed into an extruder. The assembly is now ready for the molding operation.

The extruder is now operated to force the elastomeric material through the ports 12 into the space between the central core and the sleeve S. As the injection of material continues, a back pressure begins to build up in the mold which begins to stretch and expand the sleeve S outwardly toward and against the wall of the shell and the beveled surfaces 13. Injection of the material is continued until air has been completely expelled from the mold and elastomeric material begins to be expelled through the orifice 16 in the cap 15. At this point the sleeve has been stretched and expanded into firm contact with the wall of the shell and the beveled surfaces 13 throughout the entire areas thereof. There is no contact of the injected material with either of these surfaces.

During the injection of elastomeric material the set screw 18 is usually removed, and air escapes through the orifice 16. However, if restriction is required, a set screw having a bleed passage of the desired size may be inserted.

After the mold is completely filled, the shell is unscrewed and removed from the extruder, and the cap 14 is attached and screwed down tightly. The mold is now ready to be placed in a heated curing chamber to cure the elastomeric material. In most cases it is desirable to leave open a vent passage during curing such as is provided by the orifice 16 or by a bleed passage 19 in the set screw 18, in order to provide for possible expansion of the elastomeric material. However, this depends on circumstances, and particularly on the composition of the elastomeric material and its hardness. In some cases where the composition is very soft, either no orifice is required or at most a very small bleed orifice is required. However, with harder compositions, a vent is usually required to prevent rupture of the mold.

In the manufacture of rolls for use as fuser rolls in electrostatic copying machines, silicone rubber is preferably used as the elastomeric material and is compounded to a hardness level as specified by the manufacturers of the machines, as for example, in the range between 15 and 40 Shore A. A typical outside diameter of such rolls might be 2.40 inches and the length might be approximately 19 inches. The diameter of the metal core of such rolls might be 1.75 inches so that within the mold there would be a space between the outside wall of the core and the inside wall of the mold shell of approximately 0.325 inches. Under these circumstances, the Teflon tubing would be extruded to an outside diameter of approximately 2 inches and a wall thickness of 0.02 inches. During the injection of the elastomeric material, therefore, the tubing would be stretched from a diameter of 2 inches to a diameter of 2.40 inches. As stretching takes place, the end of the sleeve is permitted to move longitudinally in the groove 9.

Such rolls would customarily be cured at a temperature of approximately 340° F. for a period of 60 to 120 minutes.

It will be understood that the invention may be variously modified and embodied within the scope of the subjoined claims.

I claim as my invention:

1. A mold for making metal cored elastomeric rolls having an outside sleeve of material in tubular form, comprising an outside shell having a cylindrical mold cavity therein, a support member at each end of the mold cavity, one of said support members at the inlet end of said cavity having ports through which elastomeric material may be injected into the mold cavity, and the other of said support members at the discharge end of the cavity having ports through which air may be discharged from the mold cavity, said support members at the inlet end of said cavity having means to support one end of a cylindrical sleeve of material spaced from but in concentric relation to the wall of the mold cavity and to lock said end of said cylindrical sleeve against longitudinal movement away from said inlet end of said cavity, and the other of said support members having means to support the other end of said sleeve in concentric relation to the wall of the mold cavity and to hold said end of said sleeve against radial movement without restricting longitudinal movement away from the discharge end of the cavity.

2. A mold according to claim 1 in which said first named support member at the inlet end of said cavity comprises a plug and a collar surrounding said plug, the surface of said plug being tapered, and in which the end of said sleeve at the inlet end of the cavity is locked between the tapered surface of the plug and the collar.

3. A mold according to claim 1 including means for restricting the discharge of material from the mold cavity comprising an end cap having an orifice of restricted area therein.

4. A mold according to claim 2 in which said second named support member at the discharge end of the cavity comprises a plug and a collar surrounding said plug in sliding engagement therewith, one end of said plug being of reduced diameter to provide a groove to receive and support the end of the sleeve at the discharge end of the cavity.

5. A mold according to claim 1 in which said second named support member at the discharge end of the cavity comprises a plug and a collar surrounding said plug in sliding engagement therewith, one end of said plug being of reduced diameter to provide a groove to receive and support the end of the sleeve at the discharge end of the cavity.

6. A mold according to claim 5 including means for restricting the discharge of material from the mold cavity comprising an end cap at the discharge end of the cavity having an orifice of restricted area therein.

7. A mold according to claim 6 in which the ports in said second named support member at the discharge end of the cavity extend through the plug thereof, said plug having an annular groove in its end face communicating with said ports and communicating with the orifice in said end cap.

* * * * *